United States Patent
Seacat

(10) Patent No.: US 9,035,886 B2
(45) Date of Patent: May 19, 2015

(54) SYSTEM AND APPARATUS FOR A MULTI-POINT TOUCH-SENSITIVE SENSOR USER INTERFACE USING DISTINCT DIGIT IDENTIFICATION

(75) Inventor: Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 877 days.

(21) Appl. No.: 12/122,305

(22) Filed: May 16, 2008

(65) Prior Publication Data

US 2009/0284480 A1    Nov. 19, 2009

(51) Int. Cl.
*G06F 3/041* (2006.01)
*G06F 3/0488* (2013.01)

(52) U.S. Cl.
CPC ............ *G06F 3/041* (2013.01); *G06F 3/04883* (2013.01); *G06F 2203/04104* (2013.01); *H04M 2250/22* (2013.01)

(58) Field of Classification Search
CPC ... G06F 3/04865; G06F 3/0487; G06F 3/044; G06F 3/04875; G06F 3/045
USPC ....... 345/173–179; 361/1; 708/200; 715/810; 178/18.01–18.04
See application file for complete search history.

(56) References Cited

U.S. PATENT DOCUMENTS

| 4,180,713 | A | 12/1979 | Gonzales |
|---|---|---|---|
| 6,246,395 | B1 | 6/2001 | Goyins et al. |
| 6,323,846 | B1 * | 11/2001 | Westerman et al. ......... 345/173 |
| 6,350,037 | B1 | 2/2002 | Adams |
| 6,654,484 | B2 | 11/2003 | Topping |
| 7,129,431 | B2 | 10/2006 | Ichimura et al. |
| 7,663,607 | B2 | 2/2010 | Hotelling et al. |
| 2002/0085043 | A1 * | 7/2002 | Ribak ............................ 345/810 |
| 2004/0037016 | A1 * | 2/2004 | Kaneko et al. ..................... 361/1 |
| 2004/0138795 | A1 | 7/2004 | Alkarawi et al. |
| 2005/0052427 | A1 * | 3/2005 | Wu et al. ....................... 345/173 |
| 2005/0073195 | A1 | 4/2005 | Popilek |

(Continued)

FOREIGN PATENT DOCUMENTS

EP    2000894    10/2008

OTHER PUBLICATIONS

U.S. Appl. No. 13/425,244 Final Office Action, dated Mar. 28, 2013.

(Continued)

*Primary Examiner* — Kimnhung Nguyen
(74) *Attorney, Agent, or Firm* — Kunzler Law Group

(57) ABSTRACT

A computer program product for a multi-point touch-sensitive sensor user interface using distinct digit identification. The computer program product may include a relationship module, an assignment module, a receiving module, a determination module, and an initiation module. The relationship module may determine a relationship between at least two digits. The assignment module may assign a distinct digit identity to each digit of the at least two digits. The receiving module may receive a digit event comprising at least one digit interaction. The determination module may determine a digit identity for each digit involved in the digit event and a digit interaction associated with each digit of the digit event. Finally, the initiation module may initiate a digit event function associated with the determined digit identity and the digit interaction. Therefore, a user has greater control over a device through the interface with each digit having a distinct function and identity.

18 Claims, 2 Drawing Sheets

(56) References Cited

U.S. PATENT DOCUMENTS

| | | | |
|---|---|---|---|
| 2005/0167252 A1 | 8/2005 | Inoue et al. | |
| 2006/0097991 A1* | 5/2006 | Hotelling et al. | 345/173 |
| 2006/0224645 A1* | 10/2006 | Kadi | 708/200 |
| 2007/0100523 A1 | 5/2007 | Trachte | |
| 2007/0139395 A1* | 6/2007 | Westerman et al. | 345/173 |
| 2007/0262964 A1* | 11/2007 | Zotov et al. | 345/173 |
| 2009/0109180 A1 | 4/2009 | Do et al. | |
| 2009/0243998 A1 | 10/2009 | Wang | |
| 2009/0284480 A1 | 11/2009 | Seacat | |

OTHER PUBLICATIONS

U.S. Appl. No. 13/425,244 Office Action, dated Aug. 23, 2013.
U.S. Appl. No. 13/425,244 Final Office Action, dated Mar. 6, 2014.
Han, "Multi-Touch Interaction Research", http://cs.nyu.edu/~jhan/ftirtouch/, 2006.
U.S. Appl. No. 13/425,244 Office Action, dated Aug. 27, 2012.
U.S. Appl. No. 13/425,244 Final Office Action, dated Jan. 15, 2013.
U.S. Appl. No. 13/425,244 Office Action, dated May 22, 2014.
U.S. Appl. No. 13/425,244 Office Action, dated Sep. 17, 2014.

* cited by examiner

SYSTEM AND APPARATUS FOR A MULTI-POINT TOUCH-SENSITIVE SENSOR USER INTERFACE USING DISTINCT DIGIT IDENTIFICATION

BACKGROUND OF THE INVENTION

1. Field of the Invention

The invention relates to multi-point touch-sensitive sensors. Particularly, the invention relates to a multi-point touch-sensitive sensor user interface using distinct digit identification.

2. Description of the Related Art

As electronic devices have proliferated, the number of ways to interact with those devices has also proliferated. One such user interaction tool, or user interface, is a touch sensitive sensor which can detect touches on its surface. Many such sensors are used in connection with a display or screen allowing a user to interact with onscreen menus or data. These touchscreens are often standard features on such devices as cellphones, Personal Digital Assistants ("PDA"s), and tablet computers.

While many touch sensitive devices are able to sense only one point of contact, multi-point touch-sensitive sensors can detect multiple, simultaneous touches. By allowing more than one contact with the sensor, the user is able to exert greater control and better accuracy over the interface of the device.

SUMMARY OF THE INVENTION

The present invention has been developed to provide a computer program product for a multi-point touch-sensitive sensor user interface using distinct digit identification. A plurality of modules configured to functionally perform the necessary steps of the computer program product may include a relationship module, an assignment module, a receiving module, a determination module, and an initiation module. The relationship module may determine a relationship between at least two digits. This relationship is based on an association between the at least two digits and the association registered by and signaled from a multi-point touch-sensitive sensor. In addition, the assignment module may assign a digit identity to each digit of the at least two digits. The digit identity is assigned based on the relationship between the at least two digits and comprises a distinct representation.

The receiving module may receive a digit event which comprises at least one digit interaction. The digit interaction may be selected from the group consisting of a single digit movement, a plurality of digit movements, a movement of a plurality of digits, a single digit contact, and a plurality of contacts. This digit event may be registered by and signaled from a multi-point touch-sensitive sensor.

The determination module may determine a digit identity for each digit involved in the digit event and a digit interaction associated with each digit of the digit event. In addition, the initiation module may initiate a digit event function which is associated with the determined digit identity and the digit interaction.

A system of the present invention is also presented for a multi-point touch-sensitive sensor user interface using distinct digit identification. The system may be embodied as processor, a multi-point touch-sensitive sensor, and a memory. The memory may comprise similar modules as described above in relation to the computer program product.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
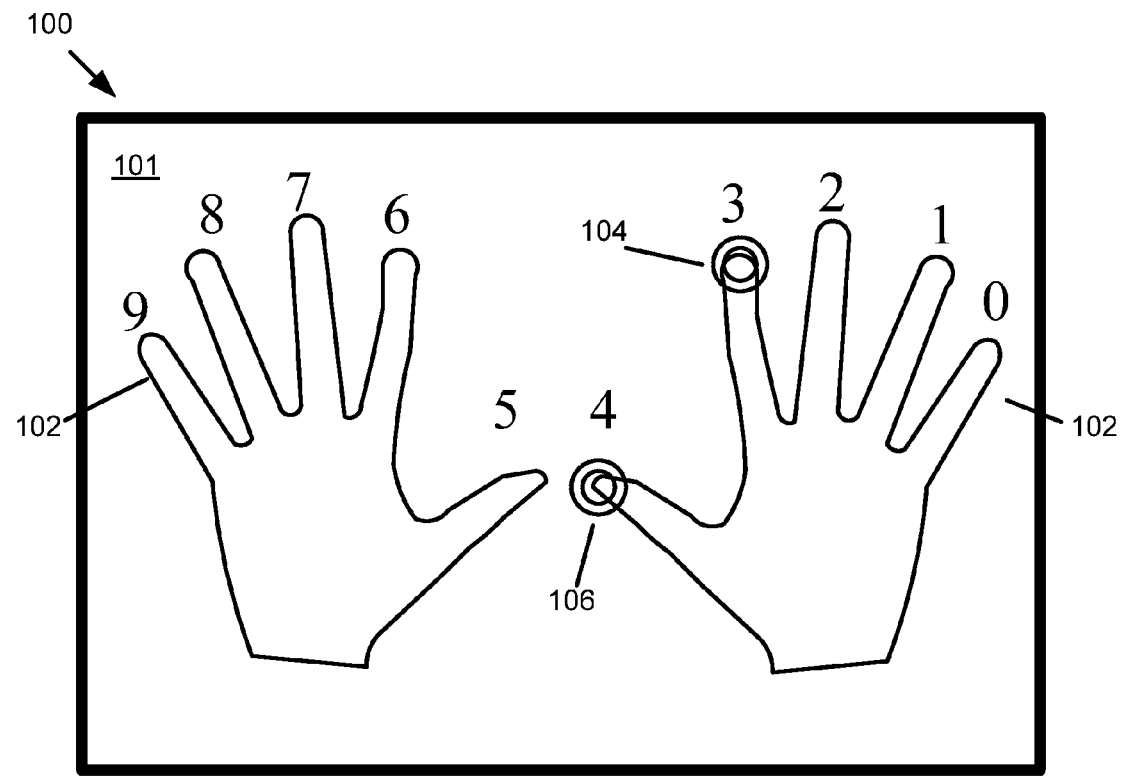
FIG. 1 illustrates a multi-point touch-sensitive sensor with a user's fingers as distinctly identified digits.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as presented in the Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, or semiconductor system, apparatus, device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIG. 1 illustrates one embodiment of a multi-point touch-sensitive user interface 100 integrated into a display with a multi-point touch sensitive embedded sensor 101. The embedded sensor 101 may be flat such as that used in computer displays, or form fitted as needed. Furthermore, the embedded sensor may be similar to the multi-point touch-sensitive sensors available from Perceptive Pixel, Inc, of New York, N.Y. A user's fingers 102 have been assigned distinct digit identities "0-9" by the user interface 100. Fingers with the digit identity "3" 104 and "4" 106 have made contact with the sensor 101. Furthermore, in addition to fingers, the digits 102 used for the sensor 101 may include but not be limited to knuckles, toes, a nose, an ear, a tongue, arms, legs, elbows, knees and a head. Furthermore, the digit may also be any object capable of being uniquely identified such as a pen, pencil, presentation pointer, and so forth. In addition to a display, the multi-point touch-sensitive sensor 101 may be integrated with any device including but not limited to a computer mouse, a video game control, a keyboard, a portable device display, an automobile steering wheel, and an electric appliance interface.

Two or more digits 102 may be assigned a digit identity by the relationship between the digits 102. This relationship may be determined by the association between the digits 102 as registered by the multi-point touch-sensitive sensor 101 during an initialization or a learning phase. The association may be based on the spatial position of one digit 104 in relation to another 106 on the sensor 101 surface, as digit "3" 104 is positioned in relation to digit "4" 106. Therefore, when digit "3" 104 and digit "4" 106 are in contact with the sensor 101 simultaneously, based on their position, the sensor 101 determines that one finger 104 corresponds with digit identity "3" and the other finger 106 corresponds to digit identity "4." The user interface 100 may then use these digit identities to determine functions to inititate. For example, digit "3" 104 may be preassigned to carry out a certain function such as launch an email application whenever digit "3" 104 makes contact with the sensor 101.

Figure 2:
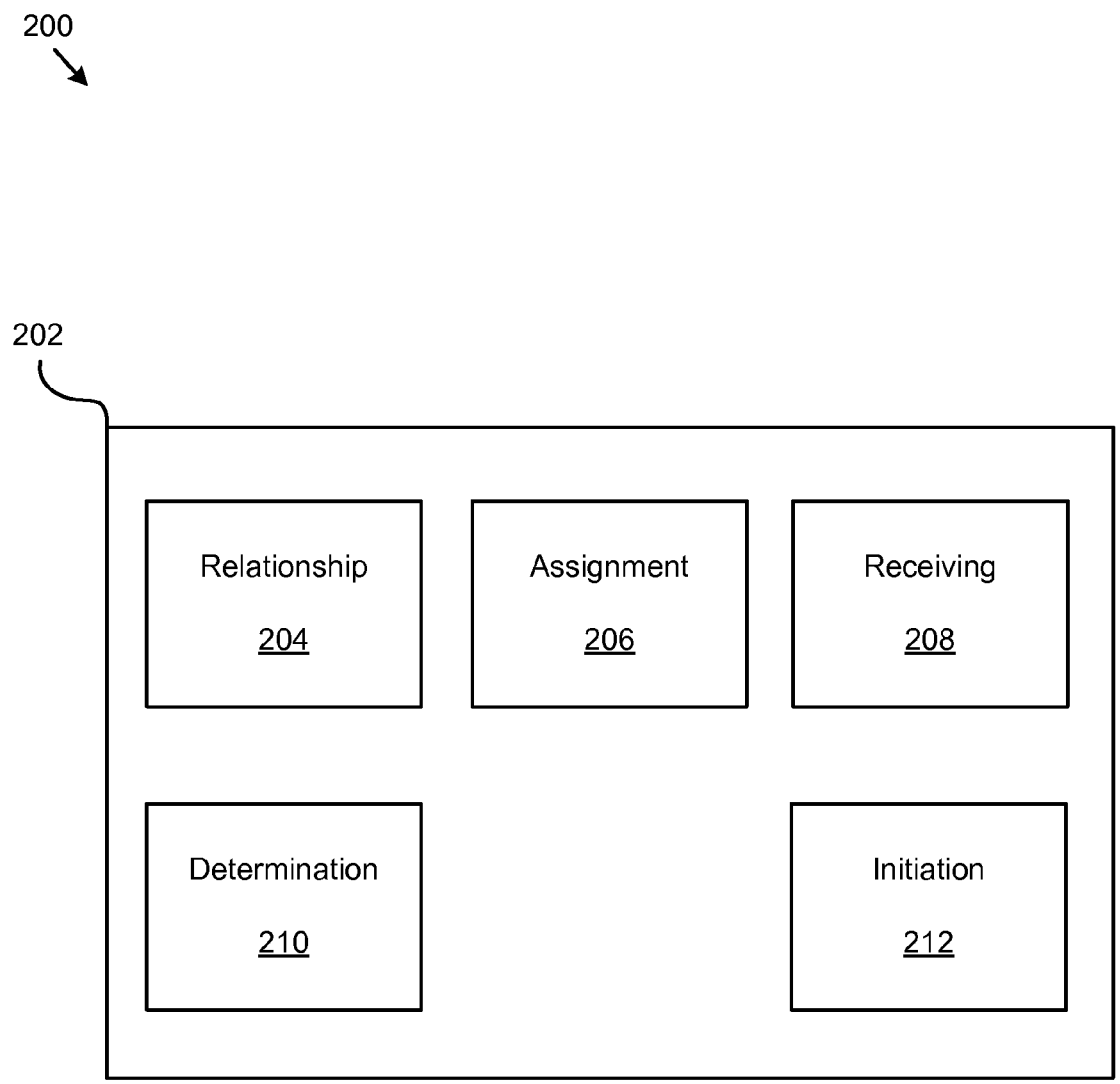
FIG. 2 is a schematic block diagram illustrating one embodiment of a computer program product for a multi-point touch-sensitive sensor user interface using distinct digit identification.

FIG. 2 illustrates one embodiment 202 of a multi-point touch-sensitive sensor user interface 100 using distinct digit identification including a relationship module 204, an assignment module 206, a receiving module 208, a determination module 210, and an initiation module 212. The relationship module 204 performs the user interface initialization. This initialization or learning phase may include configuring the sensor 101 by assigning initial digit identities. This is performed when the relationship module 204 determines a relationship between at least two digits 102 based on an association between the digits 102 as registered by and signaled from a multi-point touch-sensitive sensor 101. As mentioned above, the association may be based on the spatial position of one digit 104 in relation to another digit 106 on the sensor 101. In addition, the association may be based on the area of the sensor 101 in which the digit 102 has made contact. For example, a user may initialize the user interface by placing a thumb 106 and index finger 104 on the sensor 101 surface. The relationship module 204 determines that two distinct digits have been registered by the sensor 101 by associating the two digits with their approximate location on the sensor 101 and to each other.

The assignment module 206 assigns a distinct digit identity to each digit 102 recognized by the relationship module. For example, a user who has placed his hands on the sensor 101 may have each of his fingers 102 assigned a distinct digit identity. This digit identity may be represented as a number, an alpha-numeric character, a combination of numbers and characters, a variable, or any other distinct representation. The digit identity may uniquely identify the digit 102 whenever the digit 102 makes contact with the sensor 101.

In a further embodiment, the assignment module 206 may assign a digit identity based on unique characteristics of the digit 102. The assignment module 206 may assign a digit identity based on an amount of pressure applied by the digit 102, as different digits 102 would apply varying amounts of pressure based on their characteristics. For example, a thumb 106 would apply a different amount of pressure than an index finger 104. Consequently, the assignment module 206 may assign a distinct digit identity to the thumb 106 corresponding to the particular amount of pressure the thumb 106 applies with similar terms of assignment for the index finger 104. As a result, whenever the digit 106 makes contact with the sensor 101 applying the amount of pressure corresponding to a thumb 106, the user interface will recognize the distinct digit identity of the thumb 106.

In addition, the number of contact points to the right and left of a given contact point can be used to determine which digit made contact. If there is a single contact point to the left of a digit contact point and three contact points to the right then the user interface may determine that the digit being pressed is the second digit from the left. Furthermore, the size and shape of a digit contact point or may also be used. A thumb 106 has a different contact size and shape than an index finger 104. Furthermore, a nose has a different contact size and shape than an elbow. If fingers are used as the digits and if the sensor is configured to scan a fingerprint, the fingerprint of the fingers may be used to uniquely identify the digit.

The receiving module 208 receives a digit event from the sensor 101. The digit event refers to an interaction or contact of a digit 102 with the sensor 101. This interaction or contact may be in the form of one or more movements by the digit 102 or one or more contacts from the digit 102. For example, a digit interaction may be a simple press of two fingers 102 on the sensor 101. Conversely, the digit interaction may be a finger 104 swiping across the sensor 101 surface. Any other combination of contact or movements from one or more digits 102 may be used as digit interactions. One or more digit interactions may comprise a singe digit event.

After the receiving module 208 receives the digit event, the determination module 210 may determine a digit identity for each digit 102 involved in the digit event and the digit interaction associated with each digit 102 of the digit event. For example, if a user drags an index finger 104, which has previously been assigned a digit identity of "3", and a thumb 106, which has previously been assigned a digit identity of "4", across a sensor 101, the determination module 210 may determine that digits "3" and "4" have been dragged across the sensor 101.

Next, the initiation module 212 may initiate the digit event function associated with the determined digit identity and the digit interaction. The digit event function may be assigned to a specific digit identity regardless of the form of the digit interaction. For instance, the digit 104 with the identity of "3" may be assigned the digit event to open an internet browser window on a tablet computer display regardless of whether digit "3" makes brief contact with the sensor 101, drags across the sensor 101, or presses and remains on the sensor 101 surface. In addition, a digit event function may depend on both the digit identity and the digit interaction. For example, digit "3" may be assigned to open an internet browser window if digit "3" makes a brief contact with the sensor 101, while a sweep across the sensor 101 surface with digit "3" may cause the browser window to scroll. The user may predefine what digit event functions are implemented with certain digit identities and digit interactions.

Digit event functions may vary depending on the implementation of the sensor 101. For example, possible digit event functions for an automobile steering wheel with an integrated multi-point touch-sensitive sensor 101 may include changing a radio station, changing the compact disc ("CD") playing in the multi-disk player, changing the track on the CD, dialing a phone number with an attached Bluetooth phone, doing math on a calculator, changing the volume, changing the temperature, or picking pre-set information such as radio stations. If each of a user's fingers 102 has been assigned the digit identity "0-9", a user could easily perform math functions having every number combination possible from his fingers 102. For example a user might press digit "3" which is assigned number 3 and then digit "4" which is assigned number 4. Both 3 and 4 are added together and a result of 7 is displayed on the multi-touch device. In this example the function being performed is the addition function. However this can be generalized to take in the input from one or more digits to perform a defined function.

A volume control of a radio with "0-9" representing volume levels could be changed by a user's fingers 102. In addition, a keyboard with this user interface 202 may be implemented with each letter assigned to a different digit identity and digit implementation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory computer readable storage medium:
the non-transitory computer readable storage medium storing computer readable program code executable by a processor, the computer readable program code configured to:
assign a digit identity to each digit of at least two digits in contact with a multi-point touch sensitive sensor during a learning phase;
associate a movement interaction of a first digit and a second digit of the at least two digits across the multi-point touch sensitive sensor with a digit event function controlling an external device; and
initiate the digit event function in response to recognizing the movement interaction.

2. The non-transitory computer readable storage medium of claim 1, the computer readable program code further configured to initiate the digit event function in response to recognizing the first digit and the second digit and recognizing the movement interaction of the first digit and the second digit across a surface of the multi-point touch-sensitive sensor.

3. The non-transitory computer readable storage medium of claim 2, the computer readable code further recognizing the first digit by recognizing a relative movement of a first digit contact point to other digit contact points.

4. The non-transitory computer readable storage medium of claim 2, the computer readable code further recognizing the first digit by recognizing a contact area of the first digit.

5. The non-transitory computer readable storage medium of claim 2, the computer readable code further recognizing the first digit by recognizing a fingerprint of the first digit.

6. The computer program product of claim 1, wherein each digit is assigned an alphanumeric value.

7. The computer program product of claim 1, wherein the digit event function is selected from the group consisting of changing a radio station, changing a compact disk (CD), changing a track on the CD, dialing a phone number, doing math on a calculator, changing a volume, changing a temperature, and picking a pre-set radio station.

8. A system comprising:
a processor;
a multi-point touch-sensitive sensor;
a non-transitory memory storing computer readable program code comprising:
an assignment module configured to assign a digit identity to each digit of at least two digits in contact with a multi-point touch sensitive sensor during a learning phase and associate a movement interaction of a first digit and a second digit of the at least two digits across the multi-point touch sensitive sensor with a digit event function controlling an external device; and
an initiation module configured to initiate the digit event function in response to recognizing the movement interaction.

9. The system of claim 8, the initiation module further initiating the digit event function in response to recognizing the first digit and the second digit and recognizing the movement interaction of the first digit and the second digit across a surface of the multi-point touch-sensitive sensor.

10. The system of claim 8, wherein the digit event function is selected from the group consisting of changing a radio station, changing a compact disk (CD), changing a track on the CD, dialing a phone number, doing math on a calculator, changing a volume, changing a temperature, and picking a pre-set radio station.

11. A method comprising:
assigning, by use of a processor, a digit identity to each digit of at least two digits in contact with a multi-point touch sensitive sensor during a learning phase;
associating a movement interaction of a first digit and a second digit of the at least two digits across the multi-point touch sensitive sensor with a digit event function controlling an external device; and
initiating the digit event function in response to recognizing the movement interaction.

12. The method of claim 11, further comprising initiating the digit event function in response to a combination of recognizing the first digit and the second digit and recognizing the movement interaction.

13. The method of claim 11, further comprising initiating the digit event function in response to recognizing the first digit and the second digit and recognizing the movement interaction of the first digit and the second digit across a surface of the multi-point touch-sensitive sensor.

14. The method of claim 13, the method further comprising recognizing the first digit by recognizing an amount of pressure applied by the first digit.

15. The method of claim 13, the method further comprising recognizing the first digit by recognizing a relative position of a first digit contact point to other digit contact points.

16. The method of claim 13, the method further comprising recognizing the first digit by recognizing a contact area of the first digit.

17. The method of claim 13, the method further comprising recognizing the first digit by recognizing a fingerprint of the first digit.

18. The method of claim 11, wherein the digit event function is selected from the group consisting of changing a radio station, changing a compact disk (CD), changing a track on the CD, dialing a phone number, doing math on a calculator, changing a volume, changing a temperature, and picking a pre-set radio station.

* * * * *